(12) United States Patent
Gimbel

(10) Patent No.: US 6,883,264 B1
(45) Date of Patent: Apr. 26, 2005

(54) TELESCOPING FISHING HARPOON

(76) Inventor: Bruce S. Gimbel, 9694 Via Emilie, Boca Rotan, FL (US) 33428

( * ) Notice: Subject to any disclaimer, the term of this patent is extended or adjusted under 35 U.S.C. 154(b) by 0 days.

(21) Appl. No.: 10/834,258

(22) Filed: Apr. 29, 2004

(51) Int. Cl.$^7$ ................................................ A01K 81/04
(52) U.S. Cl. ............................................................ 43/6
(58) Field of Search ................................ 43/6; 473/578; 294/126

(56) References Cited

U.S. PATENT DOCUMENTS

| | | | |
|---|---|---|---|
| 206,694 A | * | 8/1878 | Taylor ................................ 43/6 |
| 2,980,456 A | | 4/1961 | McMullin |
| 3,150,460 A | | 9/1964 | Dees |
| 3,759,519 A | * | 9/1973 | Palma ........................ 473/578 |
| 3,932,953 A | | 1/1976 | Sharp |
| 4,004,539 A | | 1/1977 | Wesson |
| 4,052,808 A | | 10/1977 | Crabtree |
| 4,209,929 A | | 7/1980 | Mishima |
| 4,429,480 A | | 2/1984 | Stude |
| 4,720,933 A | | 1/1988 | Stude |
| 4,793,646 A | | 12/1988 | Michaud, Jr. |
| 5,243,778 A | | 9/1993 | Henley |
| 5,335,439 A | * | 8/1994 | Horton .......................... 43/6 |
| 5,593,239 A | | 1/1997 | Sallee |
| 5,600,914 A | * | 2/1997 | Tatar ............................. 43/6 |
| 6,213,672 B1 | | 4/2001 | Varga |
| 6,550,178 B1 | | 4/2003 | Rogers |
| 6,678,989 B1 | | 1/2004 | Lowe |

* cited by examiner

Primary Examiner—Teri Pham Luu
Assistant Examiner—Bret Hayes
(74) Attorney, Agent, or Firm—Richard C. Litman

(57) ABSTRACT

The telescoping fishing harpoon is a harpoon that allows for a variety of lengths to be utilized by a user. The harpoon includes a telescoping body constructed from two hollow tubes that are detachably engaged to each other through the use of a spring detent and a series of corresponding holes. Attached to the telescoping shaft is a standard harpoon shaft with a tapered head for receiving a standard harpoon dart. The telescoping shaft also incorporates a weighted dowel that assists the user in accurately spearing a desired target. The harpoon further incorporates a series of hand grips and line clips for increased control and safety for the user.

9 Claims, 3 Drawing Sheets

TELESCOPING FISHING HARPOON

BACKGROUND OF THE INVENTION

1. Field of the Invention

The present invention relates to fishing equipment, and more specifically, to a fishing harpoon with a telescoping frame that allows the harpoon to be locked into a plurality of alternate positions of varying lengths.

2. Description of the Related Art

Fishermen, both amateur and professional, commonly use a wide variety of spears and harpoons for catching fish. The fishermen require a harpoon that can be accurately propelled into the water to catch a fish or, alternatively, can be used to stab and retrieve a fish that has already been caught and is located in the water along side of the boat. It is also desirable that such a harpoon be capable of easily being converted to a variety of different lengths for better user control.

U.S. Pat. No. 3,932,953, issued Jan. 20, 1976 to Sharp, describes a fishing spear with an extensible shaft. The spear is particularly useful as an underwater hand spear for spear fishing. The spear is equipped with a telescopically extensible and collapsible shaft, including a cylindrical extension member that is located in a tubular main part and capable of being locked in a variety of extended positions. U.S. Pat. No. 4,004,539, issued Jan. 25, 1977 to Wesson, describes a marine implement that is provided with a series of attachments that can be engaged with a coupling device, preferably a threaded coupling means, located on the prod end. The implement also has a handle section containing telescoping sections and locking means for securing it in at least two different lengths.

U.S. Pat. No. 3,150,460, issued Sep. 29, 1964 to Dees, describes a fishing device for supporting a fishing implement, such as a boat hook, with a telescoping handle. The handle section is comprised of two tubular parts that telescope and can be locked into place at a variety of lengths by a series of threaded screws. U.S. Pat. No. 4,209,929 issued Jul. 1, 1980 to Mishima, describes a lance for spear fishing that is composed of a hollow tubular shaft. A resilient band is attached to the lance for carrying of the spear and propelling it through the water. The lance also has a centrally located handle grip for easy grasping of the tubing when carrying or propelling the lance.

U.S. Pat. No. 4,793,646, issued Dec. 27, 1988 to Michaud, Jr., describes an adjustable interlocking telescopic handle and arm assembly. The assembly includes at least two elongated tube members that are telescopically engaged and locked at a variety of lengths through a series of locking pins. The handle assembly further incorporates a pair of rubberized grip members mounted to the tubes for easier handling. U.S. Pat. No. 6,213,672, issued Apr. 10, 2001 to Varga, describes a telescoping pole and cleaning tool. The pole is configured from an inner tube that telescopes within an outer tube and can be locked into a variety of different lengths through the use of a series of resilient detent members on the inner tube that align with a series of holes on the outer tube. The pole is designed to attach to a cleaning attachment through the use of a similar detent pin or a threaded connection. The pole is also equipped with handle grips for easier use.

Other patents showing fishing implements include U.S. Pat. No. 4,052,808, issued Oct. 11, 1977 to Crabtree (collapsible fishing spear); U.S. Pat. No. 4,429,480, issued Feb. 7, 1984 to Stude (diving spear); U.S. Pat. No. 4,720,933, issued Jan. 26, 1988 to Stude (diving spear); U.S. Pat. No. 5,243,778, issued Sep. 14, 1993 to Henley (fishing spear); U.S. Pat. No. 6,550,178, issued Apr. 22, 2003 to Rogers; and U.S. Pat. No. 6,678,989, issued Jan. 20, 2004 to Lowe.

Other patents showing telescoping poles and handles include U.S. Pat. No. 2,606,050, issued Aug. 5, 1952 to Morris et al. (telescoping handle); U.S. Pat. No. 2,980,456, issued Apr. 18, 1961 to McMullin; and U.S. Pat. No. 5,593,239, issued Jan. 14, 1997 to Sallee.

Although the related art addresses telescoping fishing implements and other tools, there is a need for a fishing harpoon that incorporates a traditional fishing shaft and detachable fishing dart with a sturdy and reliable telescoping body. In addition, the harpoon should capable of both spearing a fish while still in hand and being accurately thrown toward a target in the water.

None of the above inventions and patents, taken either singly or in combination, is seen to describe the instant invention as claimed. Thus, a telescoping fishing harpoon solving the aforementioned problems is desired.

SUMMARY OF THE INVENTION

The telescoping fishing harpoon of the present invention allows the user great flexibility in many different fishing environments. The harpoon has a telescoping body comprised of two hollow tubes and that allows the user to lock the telescoping tubes into place at a variety of different lengths. The body is locked into place with a detent mechanism located on the inner tube that fits through one of a series of locking holes on the outer tube. The different lengths allow the harpoon to be useful with many differently sized fishing vessels.

The outer tube also incorporates a series of rubberized grip handles that allow the user greater control when stabbing a fish located boat side or when propelling the harpoon into the water. The end of the harpoon further contains an attached rope loop for tying the entire harpoon off to a safety rope.

The harpoon utilizes a standard harpoon shaft that is connected to the telescoping body through the use of a weighted dowel that is permanently affixed to the inside of the inner tube. The weighted dowel allows the harpoon to maintain maximum force and accuracy when it is propelled out of the user's hand and into the water toward a target. The standard harpoon shaft has an externally threaded end portion that screws into an internally threaded bore in the weighted dowel. In this manner, the shaft is easily replaced if it is damaged or lost.

The harpoon further utilizes a standard fishing harpoon dart that sits on a tapered end of the shaft and is detachable therefrom. The dart has a hole bored through it that allows the user to attach a fishing rope or line to it so that it does not become lost. The fishing line can further be threaded through a series of clips that are welded or bonded to the exterior surface of the inner and outer tubes.

These and other features of the present invention will become readily apparent upon further review of the following specification and drawings.

BRIEF DESCRIPTION OF TEE DRAWINGS

Similar reference characters denote corresponding features consistently throughout the attached drawings.

DETAILED DESCRIPTION OF THE PREFERRED EMBODIMENTS

Figure 1:
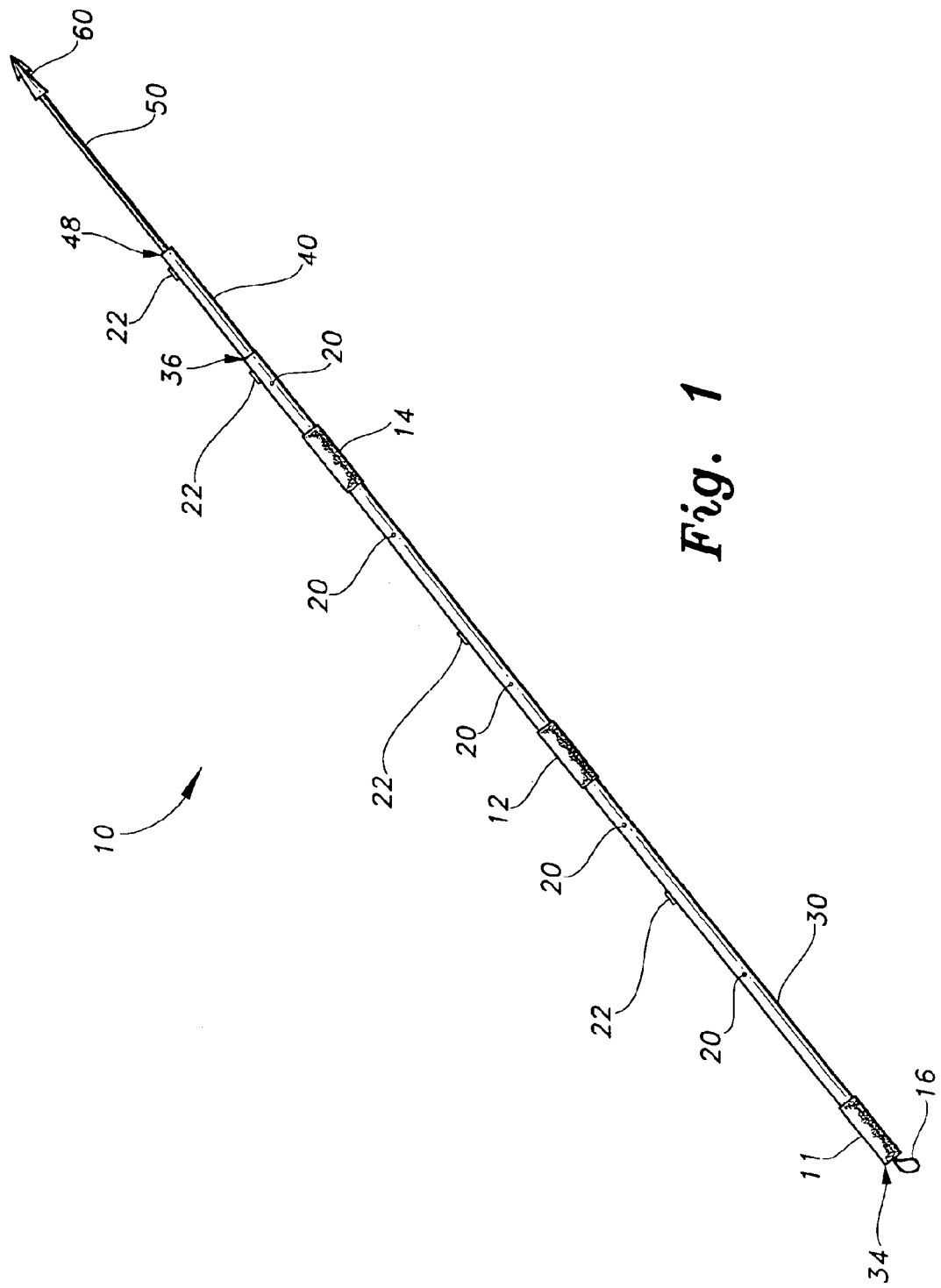
FIG. 1 is a perspective view of a telescoping fishing harpoon according to the present invention.

The present invention is a telescoping fishing harpoon, designated generally as 10 in the drawings.

Referring to FIG. 1 of the drawings, the telescoping fishing harpoon 10 is made up of an outer tube 30, an inner tube 40, a standard harpoon shaft 50, and a standard harpoon dart 60. In the preferred embodiment, the telescoping fishing harpoon 10 has three hand grips, including first hand grip 11 having rope loop 16 extending therethrough, second hand grip 12, and third hand grip 14. First grip 11 and second grip 12 are useful when spearing a fish along side of the boat, while third hand grip 14 is useful for gripping the harpoon in a balanced position when throwing the harpoon 10 when the telescoping tubes 30 and 40 are locked at maximum extension. Rope loop 16 is secured to outer tube 30 near its proximal end 34 through the use of a pin extending transversely across the interior of the tube 30, or other similar securing means, and passes through an aperture in an end wall of first hand grip 11 to its exposed position. The telescoping fishing harpoon 10 preferably includes a series of axially aligned clips 22 that are permanently affixed to the exterior surface of outer and inner tubes 30 and 40 for securing a fishing line thereto.

Figure 2:
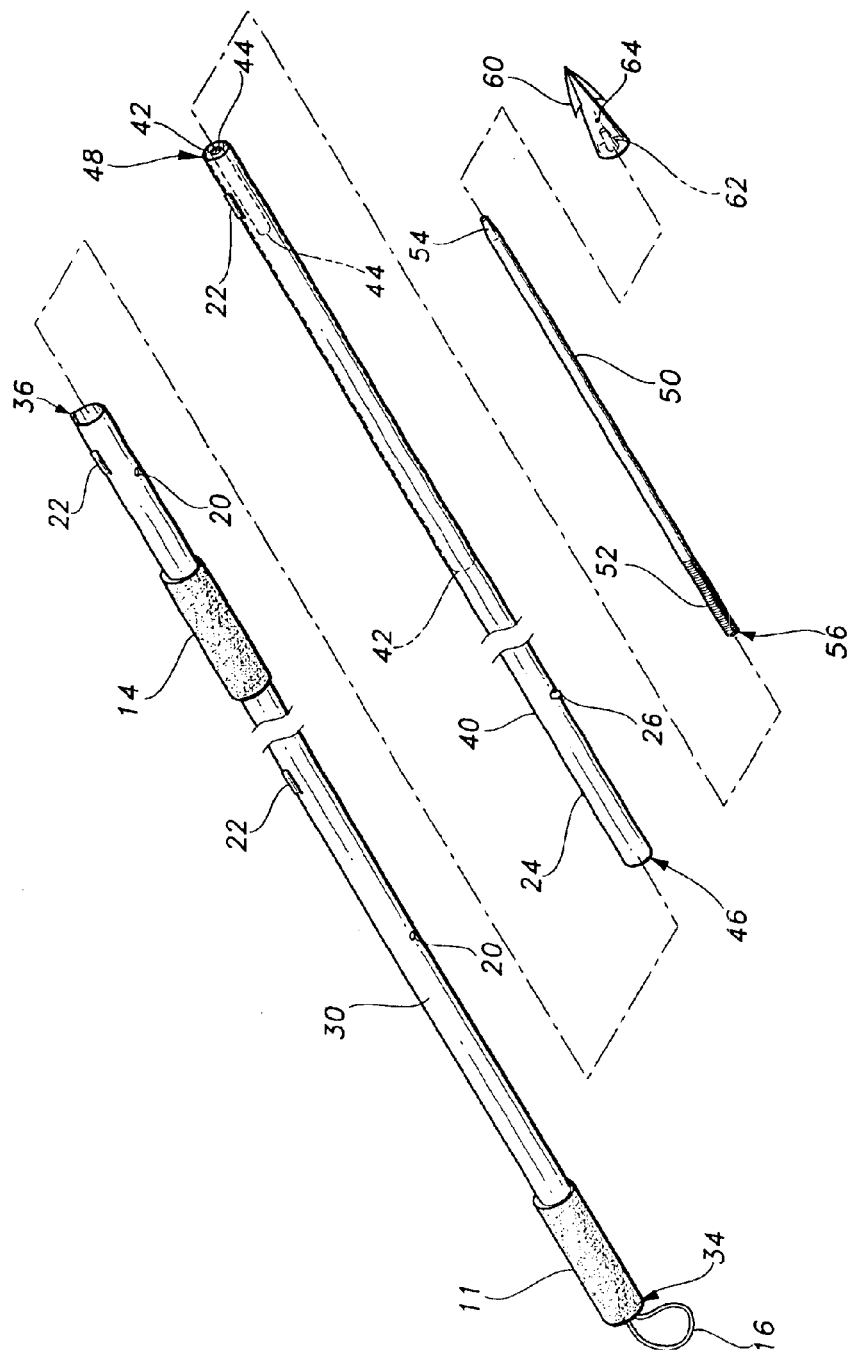
FIG. 2 is an exploded, perspective view of a telescoping fishing harpoon according to the present invention.
Figure 3:
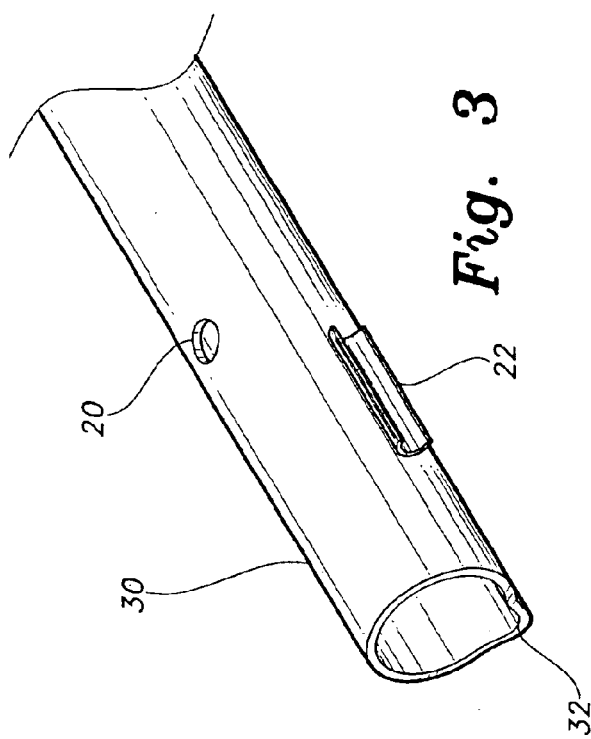
FIG. 3 is a partial, perspective view showing features of the preferred embodiment of the outer telescoping tube.

Turning now to FIG. 2 of the drawings, the fishing harpoon 10 is equipped with inner tube 40, having proximal end 46 and distal end 48, having an outside diameter slightly smaller than the inside diameter of outer tube 30 in order to fit in a telescoping relationship with outer tube 30, having proximal end 34 and distal end 36. As shown if FIG. 2, both tubes 40 and 30 have a cylindrical outer surface and a hollow interior, except as later described. The outer tube 30 is further provided with a plurality of apertures 20, each aperture 20 being dimensioned to receive the spring detent pin 26 extending from inner tube 40, thus locking the tubes 30 and 40 in place and preventing rotation of the inner tube 40 relative to the outer tube 30. FIG. 3 shows an enlarged and detailed view of the elongated groove 32 formed in the interior of outer tube 30. Groove 32 in outer tube 30 is located 180° diametrically opposite from apertures 20 and travels throughout the length of outer tube 30. Groove 32 in outer tube 40 provides an alignment guide and path for receiving spring detent 24 on inner tube 40 when proximal end 46 of inner tube 40 is inserted into distal end 36 of outer tube 40.

Referring back to FIG. 2, weighted dowel 42 is permanently welded or bonded into place inside distal end 48 of inner tube 40. Weighted dowel 42 contains an internally threaded bore 44 that is aligned with distal end 48 of inner tube 40 when the dowel is secured inside inner tube 40 and extends into weighted dowel 42, e.g., for a length of about two and one-half inches. Proximal end 56 of standard harpoon shaft 50 is threaded into weighted dowel 42 by use of external threads 52. The opposite end of standard shaft 50 has a tapered head 54 for receiving standard harpoon dart 60. Standard harpoon dart 60 has bore 62 for receiving tapered head 54 of standard shaft 50. Standard dart 60 further comprises an aperture 64 for securing a fishing line therethrough. In addition to providing for mounting of shaft 50, dowel 40 is weighted to stabilize the harpoon 10, particularly when throwing the harpoon 10.

Figure 4:
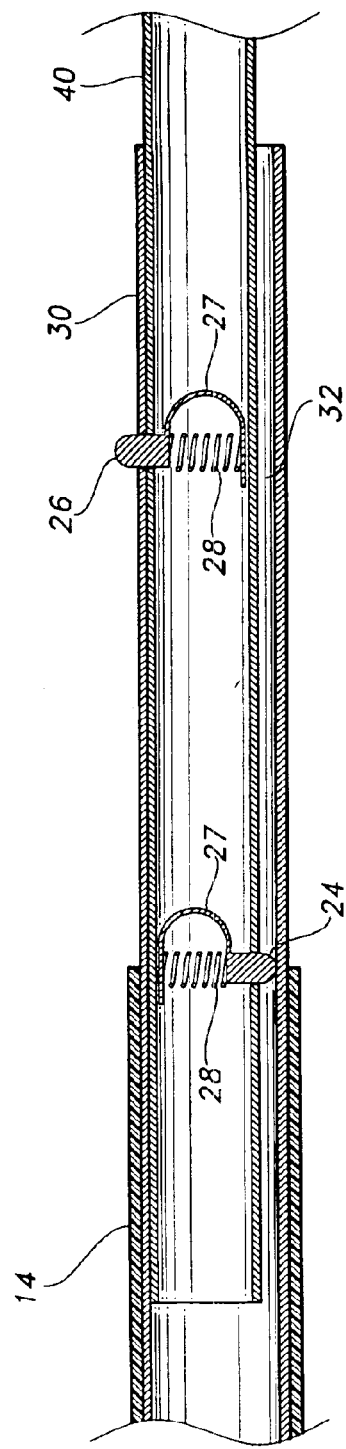
FIG. 4 is an enlarged section view showing the inner tube and outer tube locked together by the detent engagement structure according to the present invention.

Turning to FIG. 4 of the drawings, a compression spring 28 and flexible U-shaped member 27 disposed within inner tube 40 apply a biasing action urging the detent pin 26 to the projected position so that pin 26 can extend through one of the apertures 20 in outer tube 30 when aligned therewith in order to lock the tubes 30 and 40 at a fixed length. A similar U-shaped member 27 and compression spring 28 bias detent pin 24 in the opposite direction in engage groove 32 in the outer tube 30, so that pin 26 is properly aligned radially with the apertures 20 in outer tube 30. Preferably outer tube 30 has about five apertures spaced apart along the length of the tube, so that the harpoon 10 can be adjusted to one of five different lengths.

It is to be understood that the present invention is not limited to the embodiments described above, but encompasses any and all embodiments within the scope of the following claims.

I claim:

1. A telescoping fishing harpoon, comprising:
    an outer tube having a proximal first end and a distal second end, and having a hollow interior and a groove formed in the interior extending from the first end to the second end, the outer tube having a plurality of spaced apertures defined therein offset radially from the groove;
    an inner tube having a proximal first end and a distal second end, the inner tube being telescopingly disposed within the outer tube;
    a first detent pin resiliently extending from the inner tube and selectively engaging one of the apertures defined in the outer tube in order to selectively lock the inner and outer tubes at a selected length;
    a second detent pin extending from the inner tube and aligned with the groove in the outer tube in order slide longitudinally along the groove, thereby maintaining the first detent pin in radial alignment with the apertures defined in the outer tube;
    a solid cylindrical dowel having a proximal first end and distal second end, and having a cylindrical bore defined therein extending axially into the dowel from the distal end of the dowel, the dowel being fixed within the inner tube with the distal end of said dowel being in planar alignment with the distal end of said inner tube;
    a shaft having a proximal first end and a distal second end, and having a tapered head at the distal end, the proximal end of the shaft being removably inserted into the bore defined in the dowel, the distal end of the shaft extending from the inner tube; and
    a dart having a proximal first end and a distal second end, dart being removably disposed on the tapered head of the shaft.

2. The telescoping fishing harpoon according to claim 1, wherein said outer tube further comprises a first hand grip mounted to the proximal end of said outer tube.

3. The telescoping fishing harpoon according to claim 2, wherein said outer tube further comprises a second hand grip mounted to said outer tube between the proximal and distal ends thereof.

4. The telescoping fishing harpoon according to claim 3, wherein said outer tube further comprises a third hand grip member mounted adjacent the distal thereof.

5. The telescoping fishing harpoon according to claim 1, further comprising a plurality of clips permanently affixed to said outer tube and said inner tube in an axially alignment, the clips being adapted for securing a fishing line thereto.

6. The telescoping fishing harpoon according to claim 1, wherein said dart has an aperture defined therein adapted for securing a fishing line to said dart.

7. The telescoping fishing harpoon according to claim 1, wherein the cylindrical bore defined in said dowel is internally threaded.

8. The telescoping fishing harpoon according to claim 1, wherein the proximal end of said shaft is externally threaded.

9. The telescoping fishing harpoon according to claim 1, further comprising:
- a first hand grip disposed on the proximal end of said outer tube, the first grip having an end wall and a centrally located aperture defined in the end wall; and
- a resilient loop secured to the proximal end of said outer tube and extending through the aperture defined in the end wall of said first hand grip for retention to a safety rope.

* * * * *